March 12, 1968

J. R. MATHIS ETAL 3,372,548

ROCKET NOZZLE

Filed June 17, 1965

INVENTORS
JOHN R. MATHIS
GEORGE E. BUSH

BY
Thomas W. Brennan

March 12, 1968  J. R. MATHIS ET AL  3,372,548
ROCKET NOZZLE

Filed June 17, 1965  2 Sheets-Sheet 2

INVENTORS.
JOHN R. MATHIS
GEORGE E. BUSH
BY
Thomas W. Banner

United States Patent Office 3,372,548
Patented Mar. 12, 1968

3,372,548
ROCKET NOZZLE
John R. Mathis, Tremonton, Utah, and George E. Bush, Upland, Calif., assignors to Thiokol Chemical Corporation, Bristol, Pa., a corporation of Delaware
Filed June 17, 1965, Ser. No. 464,767
6 Claims. (Cl. 60—271)

This invention relates to rocket motors with or without separable nozzle assemblies. More particularly, it relates to such rocket motors and nozzles thereof having refractory throat inserts or annuli of relatively low thermal conductivity which are non-permanently and/or semi-permanently retained in the nozzle.

Because of the high speed, high temperature and attendant erosive nature of the propulsive gases of rocket motors, particularly of solid propellant motors, nozzles thereof have heretofore been constructed of substances having high resistance to these conditions, for example, graphite. Parts comprising these materials when exposed to the high temperature gases above-mentioned undergo far more rapid expansion than unexposed portions. And, since the internal peripheries of these annuli or throat inserts are ordinarily the portions so exposed, these portions tend to expand at a significantly greater rate than the outer portions thereby creating internal tensile stresses of high order which manifestly cause cracking, splits or cleavages and the like, from a phenomenon generally known as "thermal shock." In the usual practice, these annuli or throat inserts are bonded on their outer periphery to adjacent supporting parts, thereby sealing these surfaces from the hot gases and restraining them from expansion. The result is an increase in the unwanted effects of the already present thermal shock.

Use of these throat inserts or annuli is of benefit to those artisans concerned with advancing the art of rocket motors, if ways can be found to insure elimination or mitigation of the effects of thermal shock referred to above. This beneficial result can and has been achieved with the invention herein to be described which, in its broadest aspect comprises a throat insert or annulus which is positioned in the throat section of a rocket motor nozzle in a non-permanent or semi-permanent fashion.

Accordingly, it is an object of this invention to provide a "thermal shock" failure resistant nozzle throat insert or annulus for a rocket motor nozzle wherein said insert is comprised of high thermal conductivity material.

Another object of the inventon is to provide a throat insert of the character referred to wherein said insert is non-permanently retained in said motor throat.

Still another object is to provide an insert of the character described wherein means is provided to support the insert in the motor nozzle, which means is readily dislodged by the initial hot gases upon initiation of motor ignition.

A further object of the invention is to provide a rocket motor of the submerged or partially submerged nozzle type wherein the nozzle contains a throat section insert or annulus which is non-permanently retained therein.

Other objects and advantages of the invention will become more apparent from the following description when read with reference to the accompanying drawings, wherein the same parts are designated by identical characters throughout the views.

Figure 1:
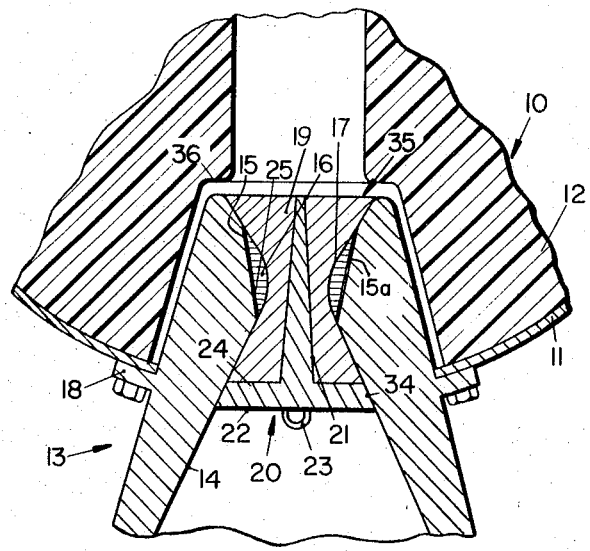
FIGURE 1 is a fragmentary, longitudinal sectional view taken of a rocket motor nozzle of the invention.

In its preferred form, the invention is shown in FIGURE 1 and constitutes a rocket motor 10 comprising a casing or pressure vessel 11 containing a centrally perforated propellant grain 12. Motor 10 is further fitted with a "submerged" or partially submerged exhaust nozzle 13 wholly or partially contained within the envelope of pressure vessel 10 in frusto-conical recess 36 in the aft end portion of grain 12. Nozzle 13 has interior surfaces in the general shape of a convergent-divergent cone or venturi 14. Venturi or cone 14 is fabricated, or otherwise formed in the usual manner, of a rigid erosion resistant material, for example, graphite, any of the ceramics, high strength steel or the like, and in the usual case, is formed with a throat between its convergent-divergent sections. In the invention herein, cone 14 has flattened portions comprising an annular seat 15. As indicated in the drawings, seat 15 is frusto-conical in shape with its "base" in the converging section of venturi or cone 14 and is adapted to receive a throat insert or annulus 16, also frusto-conical in shape. Insert 16 having internal surfaces shaped to form a throat 17, is positioned in seat 15 and in the position shown is retained therein by dimensional fit and/or gravity (depending upon orientation of nozzle 13 at time of installation of insert 16). Nozzle 13 is equipped with attaching flange 18 and is attached thereat to vessel 11 by bolts or other well known clamping or attachment means.

Throat annulus 16 is more securely retained in seat 15 by a removable retaining means or assembly 35 comprising a foamed plastic plug 19 to be more fully described hereinafter. Additional support for insert 16 is provided by a rigid, reinforcing member 20 having a rod 21 extending from the center of a base or disc 22. Reinforcing member 20 also provides a means for foaming plug 19 as will be hereinafter indicated. Disc or base 22 has a beveled, peripheral edge 34 which conforms to the angle of the divergent section of cone 14 and sealingly bears thereagainst. A handle or pull ring fixture 23 is fixed to the underside of the disc 22 to facilitate removal of the reinforcing member 20.

Plastic plug 19 is formed from any of the many foaming resin systems well known to the art and commercially available. These include the polyurethanes and other polymers such as the polysulfides, polyesters, polyethers, polystyrenes, and the natural and synthetic rubbers, mixed with appropriate gas, blowing or foaming agents. Blowing or foaming agents preferred are the low boiling point solvents such as the low boiling polyhalogenated alkanes referred to in the art as the "Freons," e.g., Freon-11, trichloromonofluoromethane (B.P. 23° C.); Freon-14, tetrafluoromethane (B.P. −128° C.); Freon-113, trichlorotrifluoroethane (B.P. 3° C.); Freon 13B1, monobromotrifluoromethane (B.P. −57° C.) and the like. Solids are also useful when selected to have a decomposition temperature less than the temperature of the exothermic reaction occurring during mixing of the reactants to form plastic plug 19 whereby gases are generated to effect foaming. Other gas liberating materials include various azo, diazo, or other nitrogen containing compounds.

Any or all of the above set forth blowing or foaming agents or mixtures thereof can be used in conjunction with any or all of the enumerated polymeric materials to satisfactorily form plastic plug 19. However, it is preferred to use the polyurethanes because of their low cost and their ability to "self" foam when brought into contact with free hydroxyl groups such as are contained in alcohol and water or their mixtures. For example, plug 19 is formed by casting in situ with nozzle 13 removed from pressure vessel 11 in the following manner. Two parts by weight of hexamethylenediisocyanate are mixed with one part of tetrafluoromethane (Freon-11) until the mixture becomes cloudy. The mixture is poured into the space between insert 16, and previously installed reinforcing member 20 (see FIG. 1) until foaming ceases. After a few minutes, depending on the ambient temperature, plastic plug 19 forms as shown and insert 16 is held tightly in place within its matrix. Nozzle 13 is then assembled by bolting on pressure vessel 11 with throat insert or annulus 16 retained firmly, though temporarily, in place.

At the time of, or immediately prior to launching of motor 10, reinforcing member 20 is easily extracted from foamed plug 19 by handle 23, leaving an escape passageway for high temperature gases generated by burning propellant grain 12 upon initiation of combustion thereof. Continued burning of grain 12 results in complete removal of plug 19 by the high temperature propulsion gases thus generated. Throat annulus 16 remains seated in convergent section seat 15 after removal of plug 19 by the action of the acceleration forces of the missile being propelled by expulsion of gases from burning propellant grain 12 and by the pressure thereof.

It has been found, surprisingly enough, that permitting the propulsive gases to enter the interstice or space 15–a between seat 15 and insert 16, thereby surrounding insert 16 with a relatively "static" quantity of high temperature gas, results in heating the interface or underside 25 of insert 16 and evenly heats entire insert 16. By making provision for even heating of insert 16, the problem of failure thereof by cracking, splintering and the like, caused by thermal shock is considerably alleviated, if not actually eliminated altogether, since it is well known that thermal shock is most likely to occur when an object is rapidly and unevenly heated.

Figure 2:
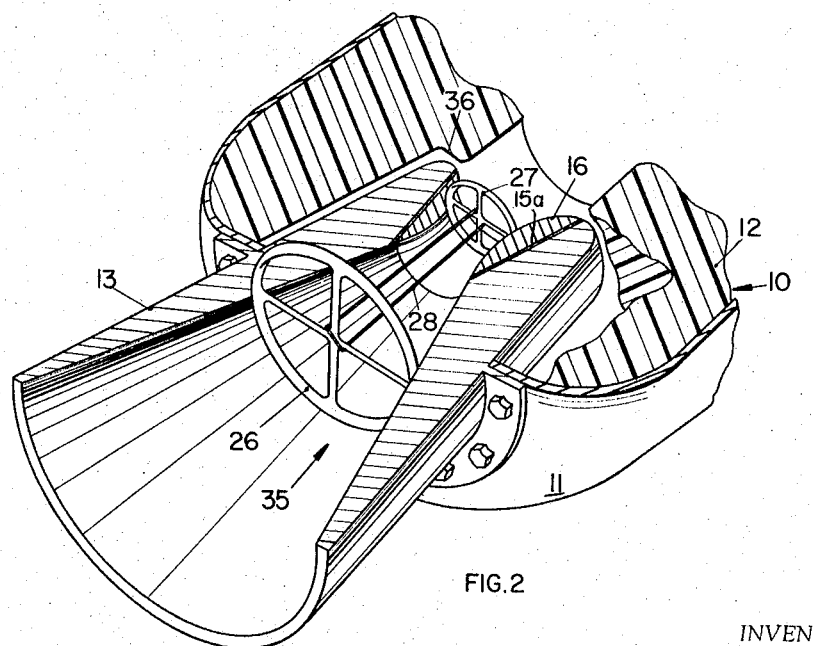
FIGURE 2 is a fragmentary, sectional perspective view, similar to FIGURE 1, illustrating an alternate form of the retaining means portion of the invention.

An alternate embodiment of retaining means or assembly 35 is illustrated in FIG. 2 wherein a pair of spoke-supported hoops or discs 26 and 27, preferably perforated, are semi-permanently fixed in the position shown by a tension member 28. Member 28 is preferably an elastic cord such as the well known "bungee" cord, or alternatively can be a spring, rope or thong held at its ends by means of a clamping device (not shown). By positioning disc 27 so as to bear against the convergent portion of insert 16 and disc 26 against the diverging section of nozzle 13, insert 16 is easily held in position in non-permanent fashion. Discs 26 and 27 in the usual instance are fabricated of consumable material, for example, resin impregnated fiberglass, or any of a multitude of well known plastic materials. Hence, upon initiation of combustion of propellant 12 and subsequent generation of high temperature and high pressure gas, discs or hoops 27 and 26 are dislodged or otherwise removed in a manner analogous to the removal of plug 19 in the FIG. 1 illustration.

Figure 3:
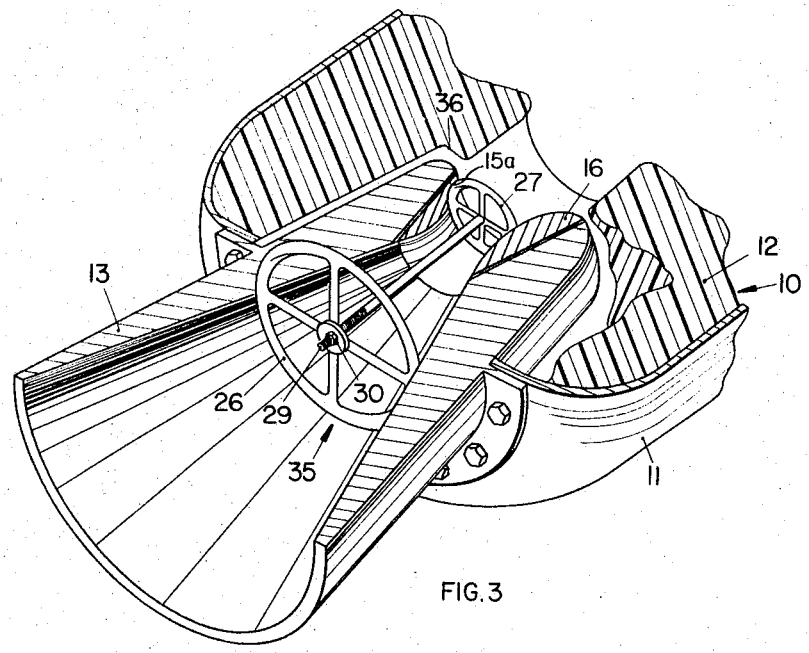
FIGURE 3 is a view similar to FIGURE 2, illustrating an additional form of the retaining means portion of the invention; and, FIGURE 4 is a view similar to FIGURE 1, illustrating an additional embodiment of the invention.

Still another embodiment of the invention is illustrated in FIG. 3, wherein retaining means or assembly 35 and spoke-supported members, discs or hoops 26 and 27 thereof are modified in their hub or central portions to receive a threaded rod or bolt 29. Rod or bolt 29 passes through the hubs of discs 26 and 27 and cap nuts 30 (one shown) are threaded over the ends thereof. Upon tightening nuts 30, discs 26 and 27 are pulled or drawn together in a manner similar to the invention of FIG. 2. Alternatively, the hub portions of discs 26 and 27 can be modified to include threaded portions and rod 29 threadably engaged therein. Upon turning rod 29 in a manner similar to a turnbuckle, discs 26 and 27 can be similarly drawn together to hold insert 16 in seat 15. In operation, upon initiation of combustion of motor 10, propellant 12, retaining assembly 35 again becomes dislodged or otherwise removed from the position shown by the high temperature and high pressure gases emanating from burning propellant 12. As hereinbefore described, insert 16 is held in place thereafter by gas pressure and missile acceleration forces.

Figure 4:
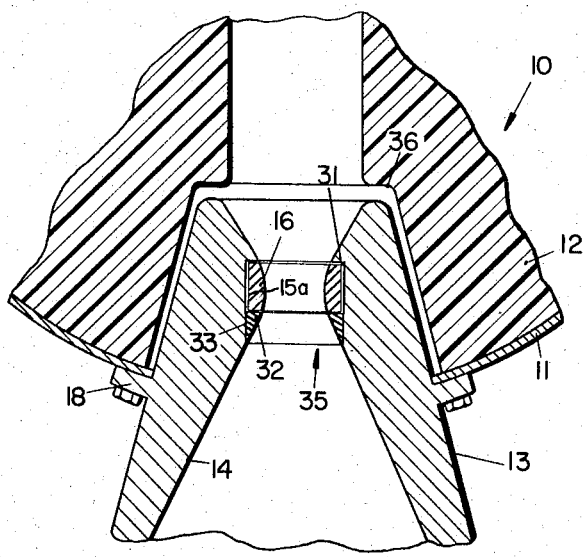

A still further embodiment of the invention is illustrated in FIG. 4, wherein the external configuration of the throat insert or annulus 16 is substantially cylindrical in shape and seated in a recess 31 in cone 14. Access to recess 31 by insert 16 is obtained by modifying cone 14 to include retaining means or assembly 35 in the form of a separable ring member 32 which is bonded to cone 14 at its outer periphery on surface 33. In practice, insert 16 is positioned in recess 31 without bonding or other attachment means, after which ring member 32 is installed and bonded at surface 33 thereby restraining annulus 16 from further significant movement.

In operation, the invention in this embodiment functions to effect even heating of annulus 16, in a manner similar to that described for the invention illustrated in FIGS. 1, 2 and 3.

Having described the invention in several of its embodiments, what has been presented to the art of rocket motors and nozzles therefor is an improvement wherein cracking, splintering or otherwise destructive effects caused in refractory throat inserts by thermal shock resulting from uneven heating in and about the rocket nozzle is obviated or its detrimental effects greatly diminished. However, it is to be understood that while the invention has been described with a certain specificity, it is not intended that it be limited thereto, since no undue limitations are to be imposed except as indicated by the subtended claims.

What is claimed is:

1. A rocket motor comprising a propellant containing casing, a converging-diverging nozzle attached to said casing, said nozzle comprising a base substantially including the converging-diverging portions thereof, a seat in said base, an annular member engaging said seat intermediate said nozzle converging-diverging portions in said base including a throat, said annular member and said seat defining a substantially annular hot gas fillable space therebetween, a removable, annular member retaining means comprising a reinforcing member having a substantially circular base portion positioned in said nozzle against the diverging section thereof and a vertical rod portion extending from said base portion interiorly of said annular member, and a foamed plastic plug supported on said base portion and said rod portion contacting said nozzle base in at least the diverging section thereof for retaining said annular member in said seat prior to ignition of said motor.

2. The motor of claim 1 wherein the plug is formed by the reaction of a polymeric compound selected from the group consisting of polysulfide, polyester, polyether, polystyrene, polyurethane and rubber and a polyhalogenated alkane foaming agent.

3. A rocket motor comprising a propellant containing casing, a converging-diverging nozzle attached to the casing, said nozzle comprising a base substantially including the converging-diverging portions thereof, a seat in said base, an annular member engaging said seat intermediate said nozzle converging-diverging portions in said base including a throat, said annular member and said seat defining a substantially hot gas fillable space therebetween, a removable, annular member retaining means comprising a pair of spaced apart members, one of said members contacting said annular member, the other of said members contacting said nozzle diverging section, and a tensioning cord attached to and extending between said spaced apart members for retaining said annular member in said seat prior to ignition of said motor.

4. The motor of claim 3 wherein the tensioning cord is a rope.

5. The motor of claim 3 wherein the spaced apart members are perforated discs.

6. The motor of claim 3 wherein the spaced apart members are spoke-supported hoops.

References Cited
UNITED STATES PATENTS

| | | | |
|---|---|---|---|
| 2,561,670 | 7/1951 | Miller et al. | 102—49 |
| 2,623,465 | 12/1952 | Jasse | 102—49 |
| 3,040,517 | 6/1962 | Ryden et al. | 102—49 |
| 3,052,090 | 9/1962 | Herzog | 60—35.6 |
| 3,104,523 | 9/1963 | O'Donnell | 102—49 |

CARLTON R. CROYLE, *Primary Examiner.*

SAMUEL FEINBERG, *Examiner.*